Figure 1:
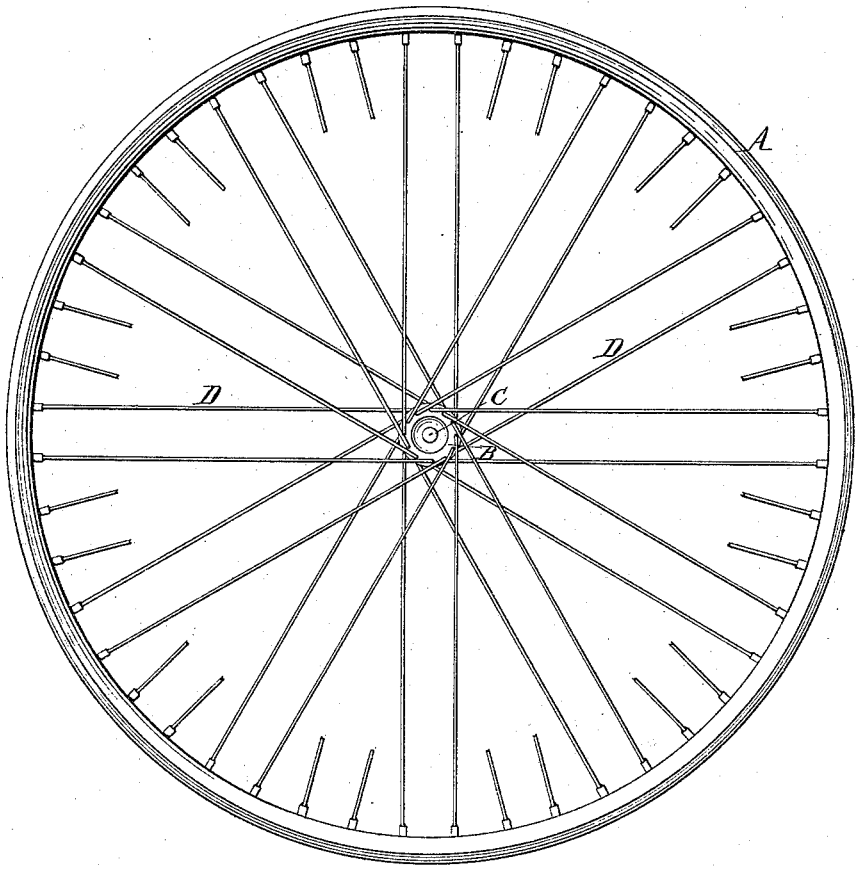

(No Model.)  2 Sheets—Sheet 1.

G. E. BLACKHAM.
BICYCLE WHEEL.

No. 311,803. Patented Feb. 3, 1885.

Witnesses:
Theo. L. Popp
Otto H. Krotz

George E. Blackham Inventor,
By Wilhelm & Bonner
Attorneys.

(No Model.) 2 Sheets—Sheet 2.
G. E. BLACKHAM.
BICYCLE WHEEL.
No. 311,803. Patented Feb. 3, 1885.
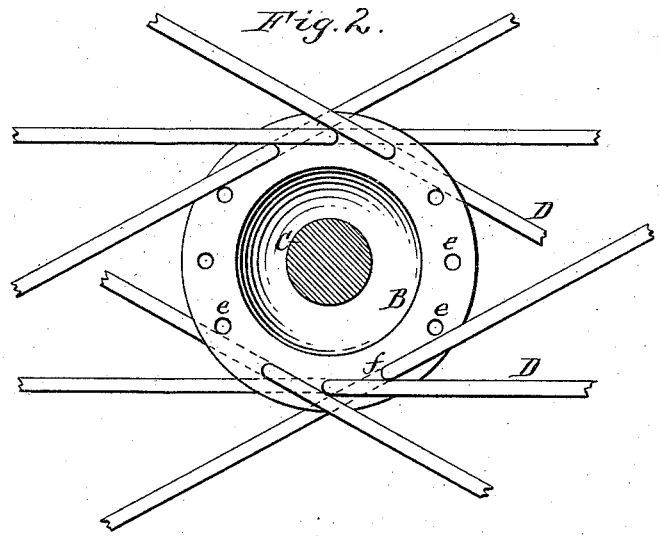
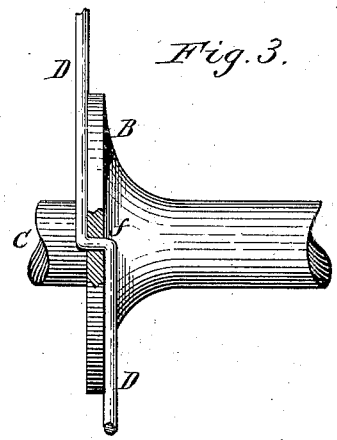
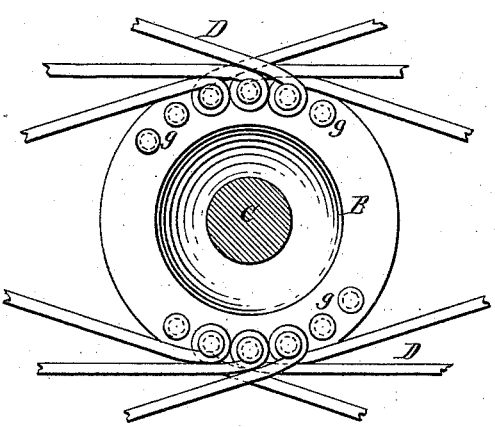
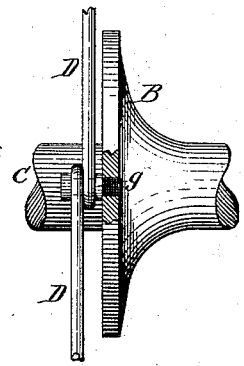
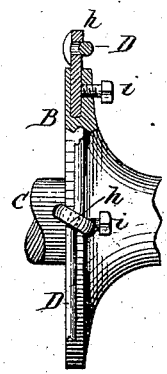
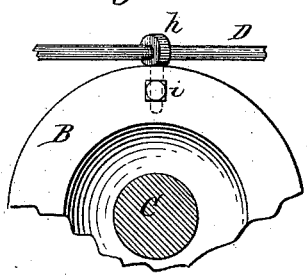
Witnesses:
Theo. L. Popp
Otto H. Krotz
Inventor:
George E. Blackham
By Wilhelm Bonner
Attorneys.

United States Patent Office.

GEORGE E. BLACKHAM, OF DUNKIRK, NEW YORK, ASSIGNOR OF TWO-THIRDS TO BULL & HAYNES AND EPHRAIM N. BOWEN, ALL OF BUFFALO, N. Y.

BICYCLE-WHEEL.

SPECIFICATION forming part of Letters Patent No. 311,803, dated February 3, 1885.

Application filed November 11, 1884. (No model.)

*To all whom it may concern:*

Be it known that I, GEORGE E. BLACKHAM, of Dunkirk, in the county of Chautauqua and State of New York, have invented a new and useful Improvement in Bicycle-Wheels, of which the following is a specification.

This invention relates to an improvement in that class of wheels for bicycles, tricycles, and similar vehicles in which the spokes are arranged in lines tangential to a circle drawn concentric with the axle of the wheel through the points at which the spokes bear upon the hub.

The object of my invention is to produce a simple, light, and strong wheel of this kind, in which the spokes are not subjected to transverse or breaking strains; and my invention consists, to these ends, of the improvements which will be hereinafter fully set forth, and pointed out in the claims.

In the accompanying drawings, Figure 1 is a side elevation of my improved wheel. Fig. 2 is a side elevation of the hub, with the spokes attached thereto, on an enlarged scale. Fig. 3 is a front elevation thereof, partly in section. Fig. 4 is a side elevation showing a different means of attaching the spokes to the hub. Fig. 5 is a front elevation thereof, partly in section. Fig. 6 is a side elevation of the hub, showing a different means of attaching the spokes thereto. Fig. 7 is a side elevation thereof, partly in section.

Like letters of reference refer to like parts in the several figures.

A represents the rim of the wheel, B the hub, C the axle, and D the spokes. The latter are arranged not in radial lines, but in lines which are tangential to a circle drawn through the points at which the spokes are attached to the hub and concentric with the axle of the wheel. Every two spokes on opposite sides of the hub are formed of a continuous piece of wire extending in a straight line across the wheel and standing tangential to the circle of attachment to the hub.

As shown in Figs. 2 and 3, the hub-flange is provided with openings $e$, and the continuous spokes are drawn through these openings, so as to form in the wire a bent portion or shoulder, $f$, whereby the spokes are attached to the hub.

In the construction represented in Figs. 4 and 5 the hub is provided with studs $g$, around which the continuous spokes are twisted. In both of these constructions the ends of the continuous spokes are attached to the rim by screw-nipples, or other suitable and well-known devices, whereby the spokes can be tightened.

In the construction represented in Figs. 6 and 7 the hub is provided with screw-eyes $h$, through which the continuous spokes are drawn. By turning these screw-eyes in their seats in the hub the spokes are tightened. The screw-eyes are secured in position after the spokes are tightened by set-screws $i$. By this arrangement of the spokes and firmly securing the spokes to the hub the strains put upon the spokes by applying power to the cranks and by the weight of the rider are transmitted to the spokes in the direction of their length, so that the spokes are only subjected to tensile strains, and all transverse or breaking strains are avoided. This arrangement of the spokes therefore permits of the use of lighter and fewer spokes than are ordinarily employed without sacrificing any portion of the strength of the wheel.

I claim as my invention—

1. In a wheel for bicycles and similar vehicles, the combination, with the rim and hub, of two opposite spokes constructed of a continuous length of wire secured at its middle to the hub, and arranged in a line which is tangential to a circle drawn concentric with the wheel through the points at which the spokes are attached to the hub, substantially as set forth.

2. In a wheel for bicycles and similar vehicles, the combination, with the rim and a hub provided with an opening for the attachment of two spokes, of two opposite spokes constructed of a continuous length of wire provided with a bent shoulder, $f$, seated in said opening in the hub, both spokes being arranged in a line which is tangential to a circle drawn concentric with the wheel through the point at which the spoke is attached to the hub, substantially as set forth.

Witness my hand this 3d day of November, 1884.

GEO. E. BLACKHAM.

Witnesses:
JNO. J. BONNER,
W. A. BULL.